United States Patent
Xi et al.

(10) Patent No.: US 11,048,359 B2
(45) Date of Patent: Jun. 29, 2021

(54) VARIABLE-CAPACITANCE PRESSURE SENSOR AND REAL-HANDWRITING STYLUS

(71) Applicant: GUANGDONG ZONGHUA TOUCH CONTROL TECHNOLOGY CO. LTD., Guangdong (CN)

(72) Inventors: Bangzi Xi, Dongguan (CN); Dezhong Zhu, Dongguan (CN)

(73) Assignee: GUANGDONG ZONGHUA TOUCH CONTROL TECHNOLOGY CO. LTD., Dongguan (CN)

( * ) Notice: Subject to any disclaimer, the term of this patent is extended or adjusted under 35 U.S.C. 154(b) by 259 days.

(21) Appl. No.: 15/566,991

(22) PCT Filed: Nov. 28, 2016

(86) PCT No.: PCT/CN2016/107424
§ 371 (c)(1),
(2) Date: Oct. 16, 2017

(87) PCT Pub. No.: WO2017/157051
PCT Pub. Date: Sep. 21, 2017

(65) Prior Publication Data
US 2018/0101272 A1    Apr. 12, 2018

(30) Foreign Application Priority Data
Mar. 15, 2016  (CN) .......................... 201610147520.4

(51) Int. Cl.
G06F 3/041    (2006.01)
G06F 3/038    (2013.01)
(Continued)

(52) U.S. Cl.
CPC .......... G06F 3/04162 (2019.05); G06F 3/017 (2013.01); G06F 3/0383 (2013.01);
(Continued)

(58) Field of Classification Search
None
See application file for complete search history.

(56) References Cited

U.S. PATENT DOCUMENTS 5,438,275 A    8/1995  Fado et al.
8,878,823 B1 *  11/2014  Kremin .................. G06F 3/044
                                                                345/179
(Continued)

FOREIGN PATENT DOCUMENTS

CN    102339179 A    2/2012
CN    102368181 A    3/2012
(Continued)

OTHER PUBLICATIONS

Feb. 13, 2017 International Search Report Issued In International Patent Application No. PCT/CN2016/107424.
(Continued)

*Primary Examiner* — Andre L Matthews (57) ABSTRACT

A variable-capacitance pressure sensor and a real-handwriting stylus. The variable-capacitance pressure sensor includes a pressure variable capacitor and a pressure touch switch, and has pressure detection function. The real-handwriting stylus includes a real-handwriting optical stylus and a real-handwriting electromagnetic stylus, and has pressure sensing function and writing effect of real handwriting.

7 Claims, 6 Drawing Sheets

(51) Int. Cl.
　　　*G06F 3/046* 　　　　(2006.01)
　　　*G06F 3/01* 　　　　　(2006.01)
　　　*G06F 3/0354* 　　　　(2013.01)
　　　*G06F 3/042* 　　　　(2006.01)

(52) U.S. Cl.
　　　CPC .......... *G06F 3/03545* (2013.01); *G06F 3/042* (2013.01); *G06F 3/046* (2013.01)

(56) References Cited

U.S. PATENT DOCUMENTS

2015/0317001 A1* 11/2015 Ben-Bassat ......... G06F 3/03545
　　　　　　　　　　　　　　　　　　　　　345/179
2018/0364821 A1* 12/2018 Kaneda ................. G06F 3/0383

FOREIGN PATENT DOCUMENTS

| CN | 104615278 A | 5/2015 |
| CN | 105607766 A | 5/2016 |

OTHER PUBLICATIONS

Feb. 13, 2017 Written Opinion Issued In International Patent Application No. PCT/CN2016/107424.

\* cited by examiner

VARIABLE-CAPACITANCE PRESSURE SENSOR AND REAL-HANDWRITING STYLUS

FIELD OF THE INVENTION

The present invention relates to a variable-capacitance pressure sensor, and in particular relates to a real-handwriting stylus.

BACKGROUND OF THE INVENTION

With the progress and development of electronic products, styluses have been applied more and more widely. At present, there are styluses for optical touch screens, and styluses for electronic whiteboards with cameras for recognition. Such a stylus is generally a finger or stick or any object or infrared emitting stick. In spite of quick use and convenient operation, such a stylus has the shortcoming that without pressure sensing function, it cannot accurately reflect characteristics of a writer's handwriting.

The existing styluses, though having stylus pressure detecting function, are long in pressure detecting distance, poor in writing experience, complicated in implementation, and high in cost.

SUMMARY OF THE INVENTION

To overcome the above shortcomings, the present invention provides a variable-capacitance pressure sensor, which is applicable to a stylus for an optical touch inductor, or a stylus for a camera electronic whiteboard, or an electromagnetic stylus and a capacitive stylus. The stylus with the pressure sensor has real handwriting effect with pressure sensing function.

In specific embodiments, the present invention discloses a variable-capacitance pressure sensor, including a variable capacitor, a touch switch and a force measuring handle; and at least including a sensor housing and a reset spring; wherein the variable capacitor includes an insulating medium sheet and a flexible conductive sheet; and wherein the touch switch includes two stationary contacts and a movable contact piece, and the touch switch is provided between the force measuring handle and the insulating medium sheet.

An electric conductor attached to a first face of the insulating medium sheet of the variable capacitor of the variable-capacitance pressure sensor is a first electrode of the variable capacitor; a second face of the insulating medium sheet is an insulating medium surface of the variable capacitor; the flexible conductive sheet arranged at a distance smaller than 1 mm from the insulating medium surface is a second electrode of the variable capacitor; the flexible conductive sheet is conductive foam that is compressible or conductive rubber that is deformable when being squeezed; and an insulating medium of the insulating medium sheet is a capacitor medium between the first electrode and the second electrode of the variable capacitor.

On the side opposite to the variable capacitor medium, the flexible conductive sheet of the variable-capacitance pressure sensor is provided with triangular convex lines or a middle convex arc on the surface, or is in any other convex shape distributed uniformly.

The variable capacitance force measuring handle of the variable-capacitance pressure sensor is in direct contact with the flexible conductive sheet; and a touch force applied to the force measuring handle is first transferred to the flexible conductive sheet, and the flexible conductive sheet is deformed and then comes into contact with the medium surface of the variable capacitor, transferring the force to the insulating medium sheet.

The greater the touch force applied to the variable capacitance force measuring handle of the variable-capacitance pressure sensor is, the greater the deformation of the flexible conductive sheet and the insulating medium sheet is, the greater the squeezed contact area between the flexible conductive sheet and the medium surface of the variable capacitor is, the greater the relative area between the first electrode and the second electrode of the variable capacitor is, and the greater the capacitance value between the first electrode and the second electrode of the variable capacitor is.

Different values of capacitance variation between the first electrode and the second electrode of the variable capacitor of the variable-capacitance pressure sensor embody different values of pressure transferred by the force measuring handle. A capacitance variation value signal is output to an external circuit, for signal acquisition or control by the external circuit.

For the touch switch of the variable-capacitance pressure sensor, the first electrode of the variable capacitor is a movable contact piece of the touch switch, and stationary contacts are arranged on the sensor housing, with a reset spring disposed between the insulating medium sheet and the sensor housing. The reset spring may be a metal wire spring, recoverable foam, or flexible rubber. Under the pressure of the force measuring handle, the insulating medium sheet is displaced and compresses the reset spring, and the movable contact piece of the touch switch touches and shorts the two stationary contacts arranged on the sensor housing so that the two stationary contacts of the touch switch are shorted and conducted; and when the pressure of the force measuring handle disappears, the reset spring is reset, and the movable contact piece of the touch switch moves away from the two stationary contacts on the sensor housing, so that the two stationary contacts of the touch switch are cut off.

The variable capacitor of the variable-capacitance pressure sensor further includes the insulating medium sheet being fixed to the sensor housing.

The touch switch of the variable-capacitance pressure sensor includes one stationary contact and one movable contact piece; the flexible conductive sheet is the stationary contact of the touch switch and the second electrode of the variable capacitor; and the movable contact piece is fixed to the upper end of the force measuring handle. When the force measuring handle for the variable capacitor is applied a force, the movable contact piece at the upper end of the force measuring handle of the variable capacitor comes into contact with the flexible conductive sheet, and the touch switch is conducted; and when the force on the force measuring handle disappears, the movable contact piece at the upper end of the force measuring handle moves away from the flexible conductive sheet, and the touch switch is turned off; and the movable contact piece at the upper end of the force measuring handle for the variable capacitor comes into contact with the flexible conductive sheet, and the flexible conductive sheet is deformed and comes into contact with the medium surface of the variable capacitor, and the force is transferred to the insulating medium sheet.

A touch switch signal of the variable-capacitance pressure sensor is output to an external circuit, to be used by the external circuit as a control signal.

The present invention also relates to a real-handwriting stylus, including a real-handwriting optical stylus and a real-handwriting electromagnetic stylus; the real-handwriting optical stylus includes the variable-capacitance pressure sensor, a stylus system circuit and a stylus housing, and at least includes a battery, an infrared (IR) transmitter and a nib; wherein the battery is a standard disposable battery that is detachable for replacement, or a rechargeable battery that can be charged repeatedly for use; wherein the force measuring handle of the variable-capacitance pressure sensor also serves as a stylus nib, wherein the IR transmitter includes an IR lens and an IR transmitting tube, the IR transmitting tube being arranged in the IR lens, the IR lens being arranged around the nib, and the IR lens uniformly transmitting infrared rays emitted by the IR transmitting tube to the surrounding of the stylus; wherein the stylus housing includes a stylus housing front end and a stylus housing rear end; the batter and the stylus system circuit are arranged in the stylus housing rear end; and the variable-capacitance pressure sensor and the IR transmitter are arranged in the stylus housing front end.

The stylus system circuit includes a radio frequency (RF) modulating and RF transmitting circuit, a driver circuit, a power control and delayed shutdown circuit, a power voltage converter and a function key, and further includes a charging circuit in the case of a rechargeable battery, and the charging circuit may be a contact wired charging circuit or a non-contact wireless charging circuit.

The power control and delayed shutdown circuit of the stylus system circuit is connected to a short conducting signal of the touch switch, and the RF modulating and RF transmitting circuit of the stylus system circuit is connected to the capacitance variation value signal of the variable-capacitance pressure sensor.

The power control and delayed shutdown circuit of the stylus system circuit is provided with a power input port, a power output port, a power charging control port and a stylus touch switch signal control port; the stylus touch switch signal control port is connected to the touch switch within the variable-capacitance pressure sensor; if the power control and delayed shutdown circuit, in a shutdown state, receives a short conducting signal connecting the touch switch of the variable-capacitance pressure sensor, the power input port and the power output port of the circuit will be conducted to each other, and the stylus system circuit will enter an operation state; in the operation state, if the short conducting signal connecting the touch switch has not been received for a long time, the power input port and the power output port of the circuit will be cut off from each other, and the stylus system circuit will enter a shutdown state; and if a charging mode is enabled at any operation state, the power input port and the power output port of the circuit will be cut off from each other, and the stylus system circuit will be locked in the shutdown state and maintained in the charging mode.

The RF modulating and RF transmitting circuit of the system circuit receives the capacitance variation value signal of the variable-capacitance pressure sensor, which is acquired and coded and then modulated into radio frequency and transmitted to an external device, which may be an optical touch inductor, and may be a computer or mobile phone; and receiving a stylus RF signal, the external device demodulates the signal into the capacitance variation value signal and correspondingly converts the capacitance variation value signal into a stylus writing pressure value signal.

In the operation state of system circuit, the driver circuit of the system circuit continuously transmits a drive signal to the IR transmitter, and the IR transmitter continuously emits infrared light, and the optical touch inductor identifies the location at the nib where the IR transmitter continuously emitting an IR signal is located as a writing trace location where the nib is currently located in a writing area.

The touch switch of the variable-capacitance pressure sensor triggers and wakes up the stylus system circuit to work. The variation quantity of the variable capacitor of the variable-capacitance pressure sensor reflects a writing pressure of the stylus, and the location of the IR transmitter in the wiring area of the optical touch inductor is the location where the wiring trace of the stylus is located.

The present invention also relates to a real-handwriting electromagnetic stylus, including the variable-capacitance pressure sensor, a stylus system circuit and a stylus housing; at least including a battery, an electromagnetic signal output coil and a nib; wherein the battery is a standard disposable battery that is detachable for replacement, or a rechargeable battery that can be charged repeatedly for use; wherein the force measuring handle of the variable-capacitance pressure sensor also serves as a stylus nib, wherein the electromagnetic signal output coil is a formed by tightly winded at least one layer of metal wires with an insulating surface for multiple turns, and is arranged around the nib; wherein the stylus housing includes a stylus housing front end and a stylus housing rear end, the stylus housing front end being made of an insulating material; the batter and the stylus system circuit are arranged in the stylus housing rear end; and the variable-capacitance pressure sensor and the electromagnetic signal output coil are arranged in the stylus housing front end.

The stylus system circuit includes an LC active oscillator circuit, a power control and delayed shutdown circuit, a power voltage converter and a function key, and further includes a charging circuit in the case of a rechargeable battery, and the charging circuit may be a contact wired charging circuit or a non-contact wireless charging circuit.

The power control and delayed shutdown circuit of the stylus system circuit is connected to the touch switch of the variable-capacitance pressure sensor, and the variable capacitor of the variable-capacitance pressure sensor is connected in parallel at an LC resonant circuit of the LC active oscillator circuit.

The power control and delayed shutdown circuit of the stylus system circuit is provided with a power input port, a power output port, a power charging control port and a stylus touch switch signal control port; the stylus touch switch signal control port is connected to the touch switch within the variable-capacitance pressure sensor; if the power control and delayed shutdown circuit, in a shutdown state, receives a short conducting signal connecting the touch switch of the variable-capacitance pressure sensor, the power input port and the power output port of the circuit will be conducted to each other, and the stylus system circuit will enter an operation state; in the operation state, if the short conducting signal connecting the touch switch has not been received for a long time, the power input port and the power output port of the circuit will be cut off from each other, and the stylus system circuit will enter a shutdown state; and if a charging mode is enabled at any operation state, the power input port and the power output port of the circuit will be cut off from each other, and the stylus system circuit will be locked in the shutdown state and maintained in the charging mode.

The LC active oscillator circuit of the stylus system circuit includes other circuit and the LC resonant circuit. The electromagnetic signal output coil is a resonant inductance of the LC resonant circuit. The variable capacitor within the variable-capacitance pressure sensor is connected in parallel at the LC resonant circuit. A function key connected in series with capacitors is connected in parallel at the LC resonant circuit. The other regulation capacitor is connected in parallel at the LC resonant circuit. The LC resonant circuit includes the electromagnetic signal output coil, the variable capacitor within the pressure sensor, the capacitors connected in series with the function key, and the other regulation capacitor. In the case of a change in the variable capacitor within the pressure sensor, or when the key is pressed and connected in series with the capacitors, or in the case of a change in the other regulation capacitor, the oscillation frequency of the LC active oscillator will be changed accordingly.

The resonant inductance of the LC active oscillator circuit, also serving as the magnetic signal output coil, outputs alternating electromagnetic signals, which include a stylus writing pressure sensing signal and a key signal, and the output signals can be fine-tuned and calibrated by the other adjustment capacitor.

The present invention also relates to a special nib, which is made of two materials, with a soft material at an end in contact for writing, and a hard material at the other fixed end.

BRIEF DESCRIPTION OF THE DRAWINGS

FIGS. 2.1 to 2.3 are schematic diagrams of embodiments of the variable-capacitance pressure sensor of the present invention.

FIG. 4.1 is a schematic diagram of a flexible conductive sheet having a surface formed with triangular convex lines, of the variable-capacitance pressure sensor of the present invention.

FIG. 4.2 is a schematic diagram of a flexible conductive sheet having a surface formed with a middle convex arc, of the variable-capacitance pressure sensor of the present invention.

FIG. 5.1 is a schematic diagram illustrating the greater a squeezing force between the flexible conductive sheet with a surface having triangular convex lines and a medium surface of a variable capacitor of the variable-capacitance pressure sensor of the present invention is, the greater a contact area is.

FIG. 5.2 is a schematic diagram illustrating the greater a squeezing force between the flexible conductive sheet with a surface having a middle convex arc and the medium surface of a variable capacitor of the variable-capacitance pressure sensor of the present invention is, the greater a contact area is.

FIGS. 6.1 to 6.4 are schematic diagrams of a real-handwriting optical stylus of the present invention.

FIGS. 7.1 to 7.4 are schematic diagrams of the real-handwriting optical stylus of the present invention.

DETAILED DESCRIPTION OF THE EMBODIMENTS

To make the technical problems to b e solved, technical solutions and beneficial technical effects of the present invention more apparent, the present invention will be further described in detail in conjunction with the drawings and embodiments. It should be understood that the specific embodiments described here are only used for illustrating rather than defining the present invention.

Figure 1:
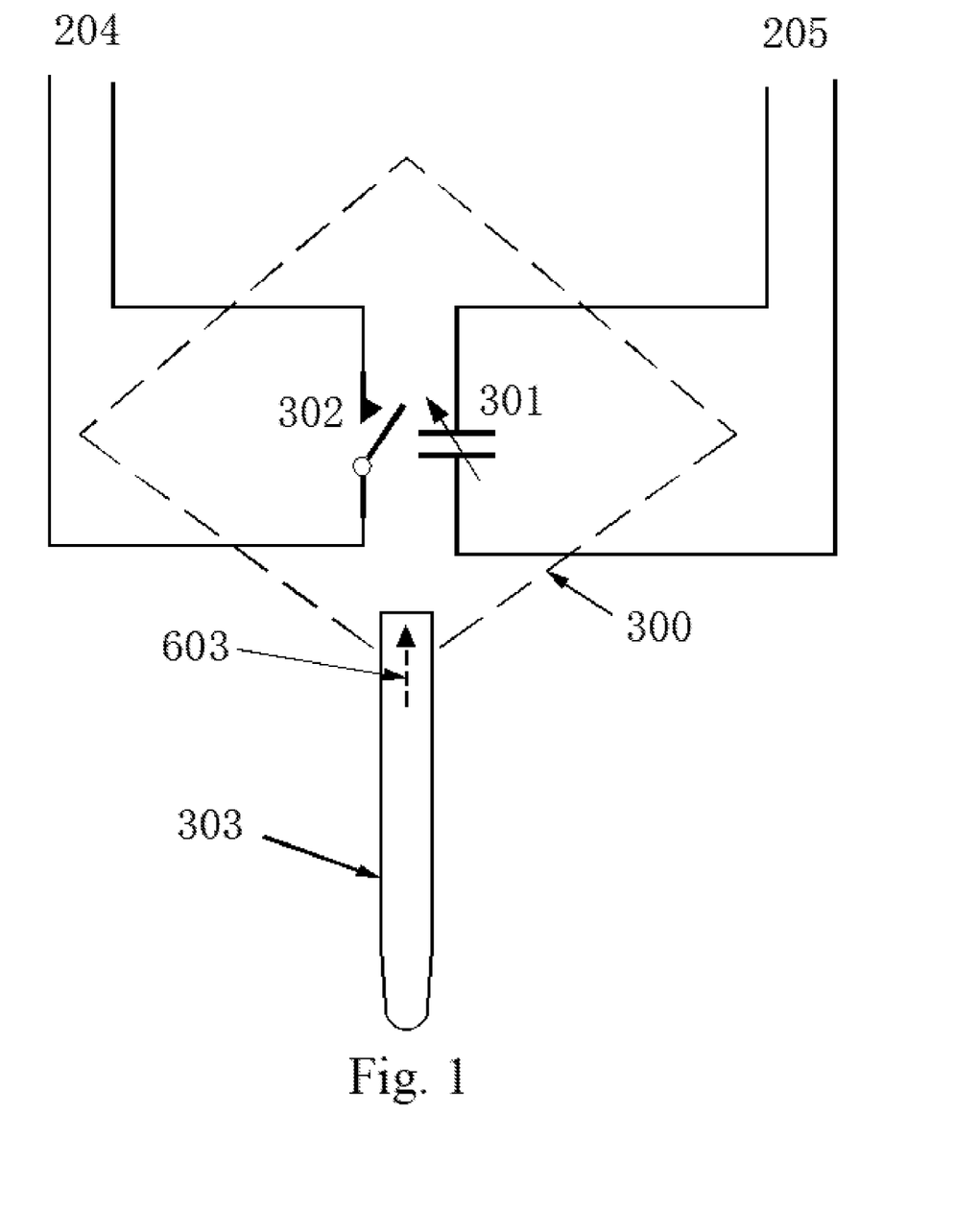
FIG. 1 is a schematic diagram of basic composition of a variable-capacitance pressure sensor of the present invention.

FIG. 1 shows a variable-capacitance pressure sensor of the present invention, which is composed of a variable capacitor (301), a touch switch (302) and a force measuring handle (303).

Figure 3:
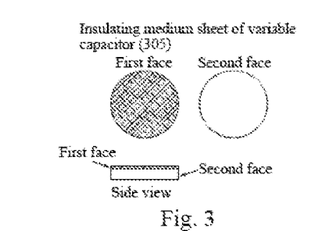
FIG. 3 is a schematic diagram of an insulating medium sheet of the variable-capacitance pressure sensor of the present invention.

FIGS. 2.1 to 2.2, FIG. 3, FIGS. 4.1 to 4.2 and FIGS. 5.1 to 5.2 illustrate embodiment 1 of the variable-capacitance pressure sensor of the present invention. Embodiment 1 is composed of a sensor housing (602), a reset spring (304), the variable capacitor including an insulating medium sheet (305) and a flexible conductive sheet (306), and the touch switch (302). An electric conductor is attached to a first face of the insulating medium sheet (305) of the variable capacitor to serve as a first electrode of the variable capacitor. A second face of the insulating medium sheet (305) of the variable capacitor is an insulating medium surface of the variable capacitor. The flexible conductive sheet (306) is arranged at a distance smaller than 1 mm from the insulating medium surface to serve as a second electrode of the variable capacitor. The flexible conductive sheet (306) is conductive foam that is compressible or conductive rubber that is deformable when being squeezed. An insulating medium on the second face of the insulating medium sheet (305) is a capacitor medium between the first electrode and the second electrode of the variable capacitor. On the side opposite to the variable capacitor medium, the flexible conductive sheet (306) is provided with triangular convex lines on the surface. On the side opposite to the variable capacitor medium, the flexible conductive sheet (307) is provided with a middle convex arc on the surface. The flexible conductive sheet may also be in any other convex shape distributed uniformly. The force measuring handle (303) for the variable capacitor is in direct contact with the flexible conductive sheet (306). A touch force (603) applied to the force measuring handle is first transferred to the flexible conductive sheet (306), and the flexible conductive sheet (306) is deformed and then comes into contact with the medium surface of the variable capacitor, i.e. transferring the force to the insulating medium sheet. The greater the touch force (603) applied to the force measuring handle (303) for the variable capacitor is, the greater the deformation of the flexible conductive sheet (306) is, the greater the squeezed deformation between the flexible conductive sheet (306) and the second face of the insulating medium is, the greater the squeezed contact area between the flexible conductive sheet (306) and the medium surface of the variable capacitor is, the greater the relative area between the first electrode and the second electrode of the variable capacitor is, and the greater the capacitance value between the first electrode and the second electrode of the variable capacitor is. FIG. 5.1 illustrates relationship between the squeezing force and the contact area between the flexible conductive sheet (306) with a surface having triangular convex lines and the medium surface of the variable capacitor, wherein the squeezing force is the smallest and the total shadow area is smallest at 0, the squeezing force is the largest and the total shadow area is largest at 4. FIG. 5.2 illustrates relationship between the squeezing force and the contact area between the flexible conductive sheet with a surface having a middle convex arc and the medium surface of the variable capacitor, wherein the squeezing force is the smallest and the total shadow area is smallest at 0, the squeezing force is the largest and the total shadow area is largest at 4. Different values of capacitance variation between the first electrode and the second electrode of the variable capacitor embody different values of pressure transferred by the force measuring handle. A capacitance variation value signal is output to an external circuit, for signal acquisition or control by the external circuit. The first electrode of the variable capacitor, i.e. the first face of the insulating medium sheet, is a movable contact piece (302b) of the touch switch (302), and stationary contacts (302a) are arranged on the sensor housing (602), with a reset spring (304) disposed between the insulating medium sheet (305) and the sensor housing (602). The reset spring (304) may be a metal wire spring, recoverable foam, or flexible rubber. Under the pressure (603) of the force measuring handle (303), the insulating medium sheet (305) is displaced and compresses the spring, and the movable contact piece (302b) of the touch switch (302) touches and shorts the two stationary contacts (302a) arranged on the sensor housing (602) so that the two stationary contacts (302a) of the touch switch (302) are shorted and conducted; and when the pressure (603) of the force measuring handle (303) disappears, the reset spring (304) is reset, and the movable contact piece (302b) of the touch switch (302) moves away from the two stationary contacts (302a) on the sensor housing (602), so that the two stationary contacts (302a) of the touch switch (302) are cut off. FIG. 2.3 illustrates embodiment 2 of the variable-capacitance pressure sensor of the present invention, wherein the insulating medium sheet (305) is fixed to the sensor housing (602); the touch switch (302) includes one stationary contact and one movable contact piece; the flexible conductive sheet (306 or 307) is the stationary contact (302a) of the touch switch (302) and the second electrode of the variable capacitor; and the movable contact piece (302b) of the touch switch (302) is fixed to the upper end of the force measuring handle (303). When the force measuring handle (303) for the variable capacitor (301) is applied a force (603), the movable contact piece (302b) at the upper end of the force measuring handle (303) comes into contact with the flexible conductive sheet (306 or 307), and the touch switch (302) is conducted; and when the force (603) on the force measuring handle (303) disappears, the movable contact piece (302b) at the upper end of the force measuring handle (303) moves away from the flexible conductive sheet (306 or 307), and the touch switch (302) is turned off. When the force measuring handle (303) for the variable capacitor (301) is applied a force (603), the movable contact piece (302b) at the upper end of the force measuring handle (303) comes into contact with the flexible conductive sheet (306 or 307), and the flexible conductive sheet (306 or 307) is deformed and comes into contact with the medium surface of the variable capacitor, and the force is transferred to the insulating medium sheet (305).

Figure 23:
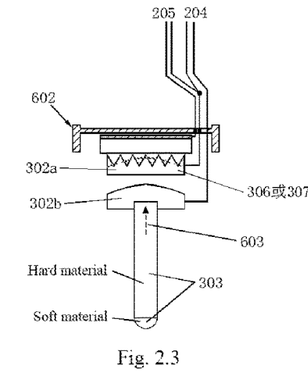
Figure 41:
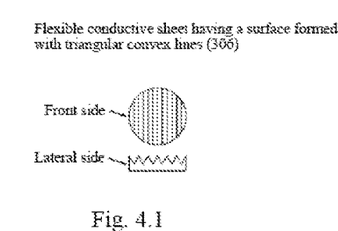
Figure 42:
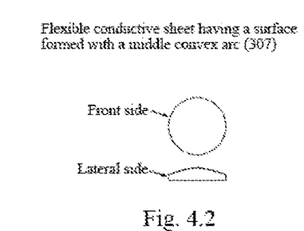
Figure 51:
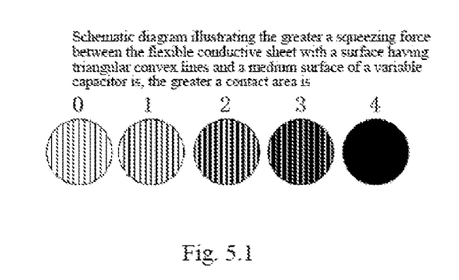
Figure 52:
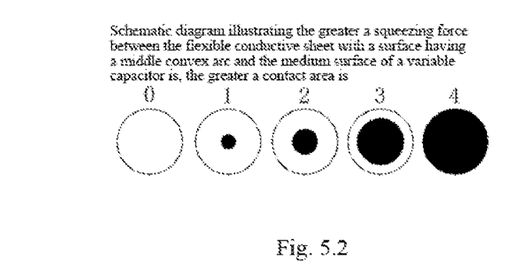
Figure 61:
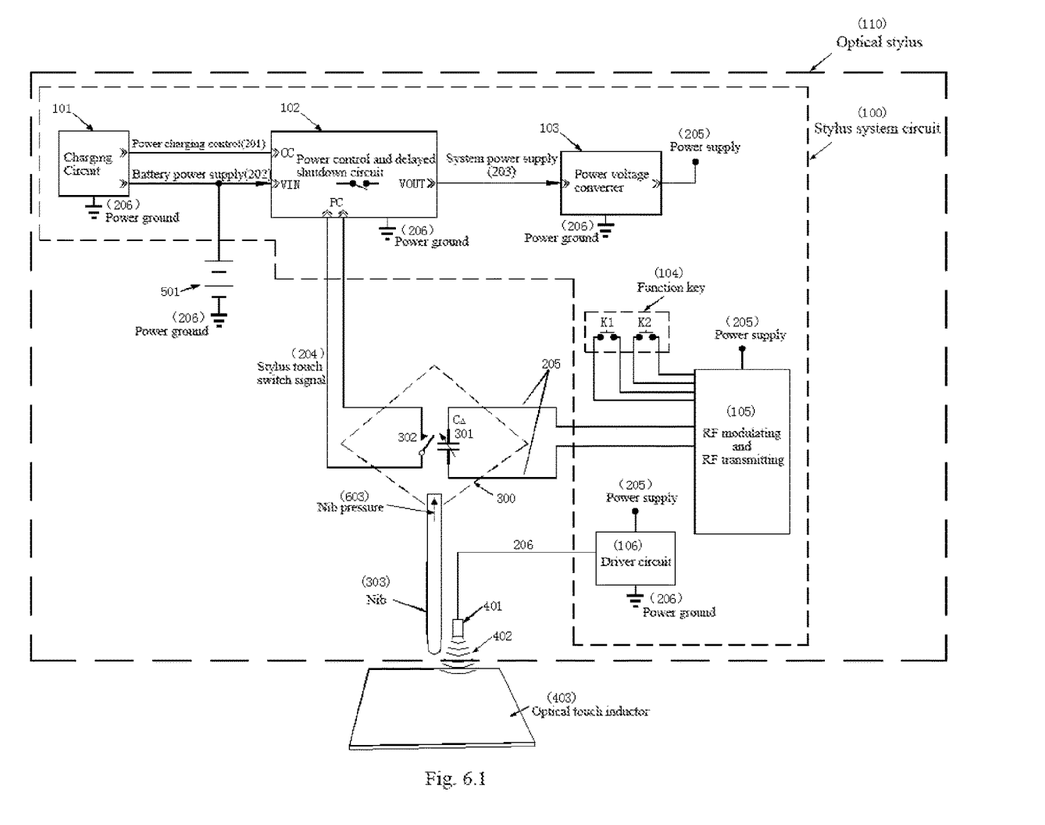
Figure 62:
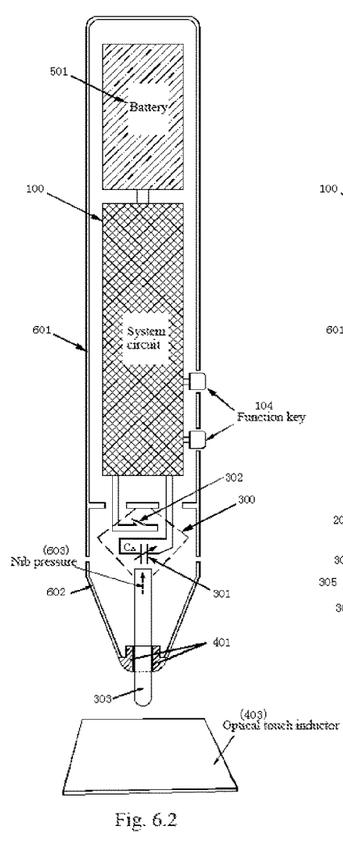
Figure 63:
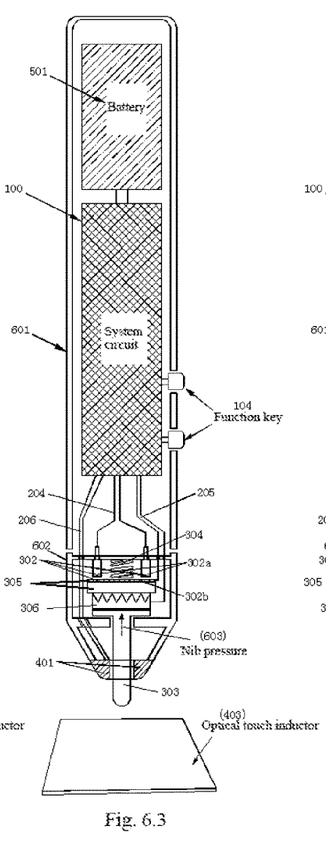
Figure 64:
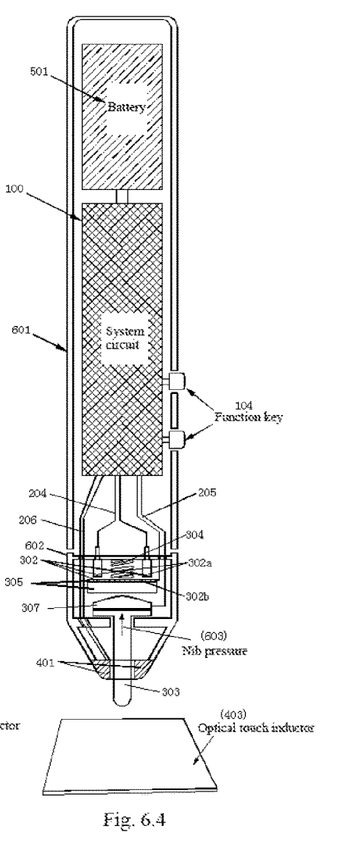
Figure 71:
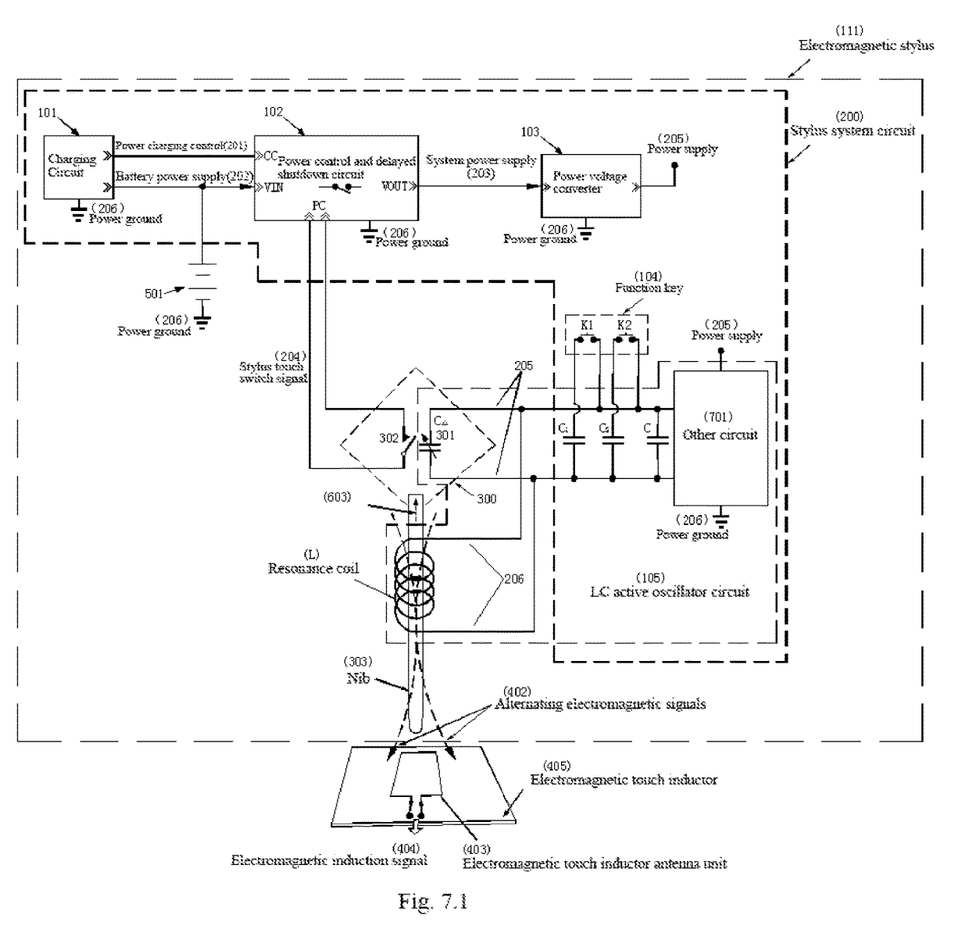
Figure 72:
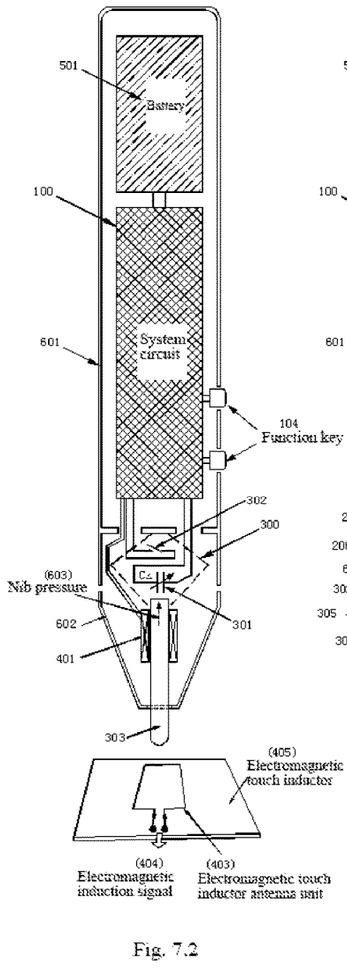
Figure 73:
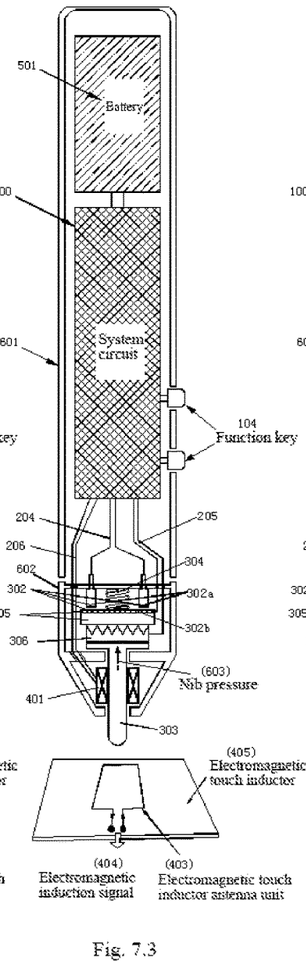
Figure 74:
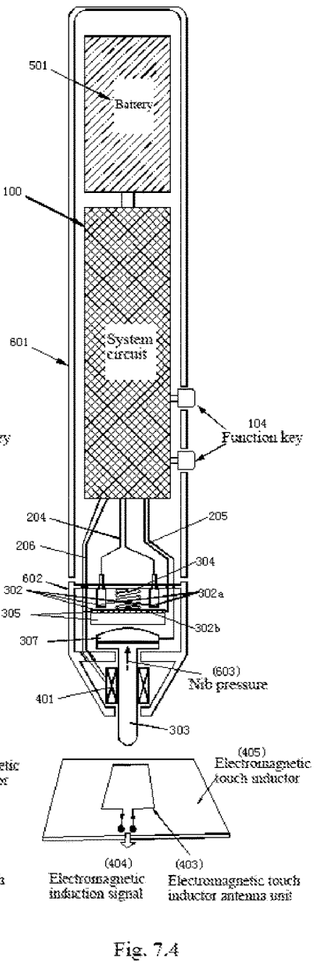

A touch switch signal (204) is output to an external circuit, to be used by the external circuit as a control signal.

With respect to the real-handwriting stylus of the present invention, a real-handwriting optical stylus and a real-handwriting electromagnetic stylus are provided.

FIGS. 6.1 to 6.4 illustrate the real-handwriting optical stylus of the present invention, composed of a variable-capacitance pressure sensor (300), a stylus system circuit (100) and a stylus housing. The stylus housing has a stylus housing front end (602) and a stylus housing rear end (601). A battery (501) and the stylus system circuit (100) are arranged in the stylus housing rear end (601), and the variable-capacitance pressure sensor (300) and an infrared (IR) transmitter (401) are arranged in the stylus housing front end (602).

The battery (501) is a standard disposable battery that is detachable for replacement, and may also be a rechargeable battery that can be charged repeatedly for use; and the force measuring handle (303) of the variable-capacitance pressure sensor (300) also serves as a stylus nib (303).

The IR transmitter (401) includes an IR lens and an IR transmitting tube, the IR transmitting tube being arranged in the IR lens, the IR lens being arranged around the nib (303), and the IR lens uniformly transmitting infrared rays emitted by the IR transmitting tube to the surrounding of the stylus.

The stylus system circuit (100) includes a radio frequency (RF) modulating and RF transmitting circuit (105), a driver circuit (106), a power control and delayed shutdown circuit (102), a power voltage converter (103) and a function key (104), and further includes a charging circuit (101) in the case of a rechargeable battery, and the charging circuit (101) may be a contact wired charging circuit or a non-contact wireless charging circuit.

The power control and delayed shutdown circuit (102) of the stylus system circuit (100) is connected to a short conducting signal (204) of the touch switch, and the RF modulating and RF transmitting circuit (105) is connected to the capacitance variation value signal (205) of the variable-capacitance pressure sensor.

The power control and delayed shutdown circuit (102) of the stylus system circuit (100) is provided with a power input port (VIN), a power output port (VOUT), a power charging control port (CC) and a touch switch signal control port (PC). The touch switch signal control port (PC) is connected to the touch switch (302) within the variable-capacitance pressure sensor (300). If the power control and delayed shutdown circuit (102) receives the short conducting signal of the touch switch (302) of the variable-capacitance pressure sensor (300) in a shutdown state, the power input port (VIN) and the power output port (VOUT) of the circuit will be conducted to each other, and the stylus system circuit (100) will enter an operation state. In the operation state, if the short conducting signal connecting the touch switch (302) has not been received for a long time, the power input port (VIN) and the power output port (VOUT) of the circuit will be cut off from each other, and the stylus system circuit (100) will enter a shutdown state. If a charging mode is enabled at any operation state, the power input port (VIN) and the power output port (VOUT) of the circuit will be cut off from each other, and the stylus system circuit (100) will be locked in the shutdown state and maintained in the charging mode. The RF modulating and RF transmitting circuit (105) receives the capacitance variation value signal (205) of the variable-capacitance pressure sensor (300), which is acquired and coded and then modulated into radio frequency and transmitted to an external device. The RF modulating and RF transmitting circuit (105) may be a Bluetooth or WiFi RF circuit generally in the 2.4 GHz or other frequency band. The external device may be an optical touch inductor (403), and may be a computer or mobile phone. Receiving a stylus RF signal, the external device demodulates the signal into the capacitance variation value signal and correspondingly converts the capacitance variation value signal into a stylus writing pressure value signal. In the operation state of stylus system circuit, the driver circuit (106) of the stylus system circuit (100) continuously transmits a drive signal to the IR transmitter, and the IR transmitter (401) continuously emits infrared light, and the optical touch inductor (403) identifies the location at the nib (303) where the IR transmitter (401) continuously emitting an IR signal (402) is located as a writing trace location where the nib is currently located in a writing area. The touch switch (302) of the variable-capacitance pressure sensor (300) triggers and wakes up the stylus system circuit (100) to work. The variation quantity of the variable capacitor (301) of the variable-capacitance pressure sensor (300) reflects a writing pressure of the stylus, and the location of the IR transmitter (401) in the wiring area of the optical touch inductor (403) is the location where the wiring trace of the stylus is located.

FIGS. 7.1 to 7.4 illustrate the real-handwriting electromagnetic stylus of the present invention, composed of a variable-capacitance pressure sensor (300), a stylus system circuit (100) and a stylus housing. The stylus housing has a stylus housing front end (602) and a stylus housing rear end (601). A batter (501) and the stylus system circuit (100) are arranged in the stylus housing rear end (601), and the variable-capacitance pressure sensor (300) and an electromagnetic signal output coil (L) are arranged in the stylus housing front end (601).

The battery (501) is a standard disposable battery that is detachable for replacement, and may also be a rechargeable battery that can be charged repeatedly for use; and a force measuring handle (303) of the variable-capacitance pressure sensor (300) also serves as a stylus nib (303). The electromagnetic signal output coil (L) is a formed by tightly winding at least one layer of metal wire with an insulating surface for multiple turns. The metal wires may be an enameled copper or silver wires, and may also be a cotton covered copper or silver wires. A magnetic core may be arranged in the coil to reduce the volume of the electromagnetic signal output coil (L) and increase the signal output intensity and output efficiency of the electromagnetic signal output coil (L). The annular electromagnetic signal output coil (L) is arranged around and near the nib (303), within the stylus housing front end (602) which is made of an insulating material.

The stylus system circuit (100) includes an LC active oscillator circuit (105), a power control and delayed shutdown circuit (102), a power voltage converter (103) and a function key (104), and further includes a charging circuit (101) in the case of a rechargeable battery, and the charging circuit (101) may be a contact charging circuit or a non-contact wireless charging circuit. The power control and delayed shutdown circuit (102) is connected to a touch switch (302) of the variable-capacitance pressure sensor (300), and the variable capacitor (301) of the variable-capacitance pressure sensor (300) is connected in parallel at an LC resonant circuit (including C, C1, C2, CΔ namely 301, and L) of the LC active oscillator circuit (105) of the stylus system circuit (100).

The power control and delayed shutdown circuit (102) of the stylus system circuit (100) is provided with a power input port (VIN), a power output port (VOUT), a power charging control port (CC) and a touch switch signal control port (PC). The touch switch signal control port (PC) is connected to the touch switch (302) within the variable-capacitance pressure sensor (300). If the power control and delayed shutdown circuit (102), in a shutdown state, receives a short conducting signal of the touch switch (302) of the variable-capacitance pressure sensor (300), the power input port (VIN) and the power output port (VOUT) of the circuit will be conducted to each other, and the stylus system circuit (100) will enter an operation state. In the operation state, if the short conducting signal connecting the touch switch (302) has not been received for a long time, the power input port (VIN) and the power output port (VOUT) of the circuit will be cut off from each other, and the stylus system circuit (100) will enter a shutdown state. If a charging mode is enabled at any operation state, the power input port (VIN) and the power output port (VOUT) of the circuit will be cut off from each other, and the stylus system circuit (100) will be locked in the shutdown state and maintained in the charging mode.

The LC active oscillator circuit of the stylus system circuit (100) includes other circuit (701) and the LC resonant circuit. The electromagnetic signal output coil (L) is a resonant inductance of the LC resonant circuit. The variable capacitor (CΔ, namely 301) within the variable-capacitance pressure sensor is connected in parallel at the LC resonant circuit. A function key (104) connected in series with capacitors (C1 and C2) is connected in parallel at the LC resonant circuit. The other regulation capacitor (C) is connected in parallel at the LC resonant circuit. The LC resonant circuit includes the electromagnetic signal output coil (L), the variable capacitor (CΔ, namely 301) within the pressure sensor, the capacitors (C1 and C2) connected in series with the function key (104), and the other regulation capacitor (C). An operation frequency of the LC active oscillator circuit (105) is determined by the formula $$f = \frac{1}{2\pi\sqrt{L*(C+C1+C2+C\Delta)}}.$$

According to this formula, in the case of a change in the variable capacitor (CΔ, namely 301) within the pressure sensor (300), or when the key is pressed and connected in series with the capacitors (C1 and C2), or in the case of a change in the other regulation capacitor (C), the oscillation frequency f of the LC active oscillator (105) will be changed accordingly.

The resonant inductance of the LC active oscillator circuit (105), also serving as the magnetic signal output coil (L), outputs alternating electromagnetic signals (402), which include a stylus writing pressure sensing signal and a function key signal, and the output signals can be fine-tuned and calibrated by the other adjustment capacitor (C).

The nib may be made of an insulating material, and may also be made of a conductive material, and can be connected to the electric field output signals (402) in the case of the conductive material nib 107 to directly replace an electric field signal radiation antenna (114); or connected with the electric field signal radiation antenna (114) to jointly serve as the electric field signal radiation antenna, to improve the electric field signal radiation intensity and increase the writing sensitivity of the capacitor-mode stylus.

Figure 21:
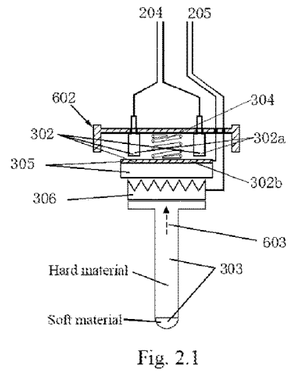
Figure 22:
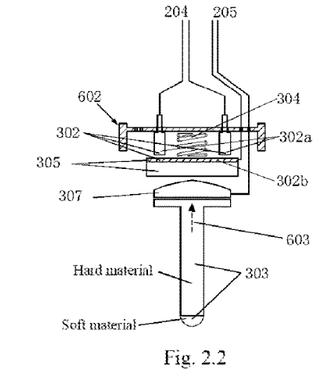

FIGS. 2.1 to 2.3 illustrate a special nib. The nib is made of two materials, with a hard material at a fixed end, such as reinforced plastic, PC or ABS material, and with a soft material at an end in contact with a touch panel for writing, such as hard rubber, PVC, TPU or paper fiber-like substance, such that the nib is not prone to skidding when writing on a glass panel of a mobile phone or tablet computer, with a sense of reality of writing on paper using a water-based pen. A lead zirconate titanate (PZT) piezoelectric ceramic doped with Mo, Ti, Na and Cr is used at the nib, which may be used for sensing pressure, and may be used as the radiation antenna for outputting electric field signals. The PZT material contains the components with the respective weight ratios: Mo: 3.0-6.6 wt %, preferably 4.0%-5.6%; Ti: 0.01-0.1 wt %, preferably 0.05-0.1%; Na: 0.01-0.1 wt %, preferably 0.03%-0.05%; and Cr: 2-5 wt %, preferably 3-3.4%.

As $d_{33}$ and Kp values of the doped material increase, the hardness increases, with the piezoelectric sensitivity becoming higher, and it can output stronger electric signals when serving as the antenna.

The doped PZT material is first sintered in $N_2$ and Ar atmosphere, then sintered in $H_2$ atmosphere, and sintered in the same conditions in $O_2$ atmosphere. The three times of sintering achieve an effect more than an overlapped effect of three times of sintering. The doped PZT piezoelectric ceramic has more voids, so that $N_2$ enters ceramic pores in the $N_2$ and Ar atmosphere, $N_2$ that has entered the pores becomes more active in the $H_2$ atmosphere, and finally $N_2$ is substituted by $O_2$ in the $O_2$ atmosphere, where oxygen molecules are prone to be replaced by oxygen icons in a crystal lattice and removed. The doped material subjected to such sintering is more compact in structure. The sintering is conducted at the pressure of 300-325 MPa. Although general high-pressure sintering is conducted below 200 MPa, the piezoelectric ceramic made of four materials being sintered is adopted in the present application, and it would be best to carry out sintering at the pressure of 300-325 MPa in order that the dopant effect is better embodied in ceramic performance. The nib made of the material of the aforesaid components prepared by the aforesaid method can achieve appropriate stylus nib hardness, and its hardness and sensitivity are very suitable for functional touch control, to achieve better writing effect of real handwriting.

Described above is a real-handwriting stylus of the present invention, and obvious improvements and modifications that can be made thereto by those skilled in the art shall all be encompassed within the protection scope of the present invention.

The invention claimed is:

1. A real-handwriting stylus, comprising a real-handwriting optical stylus or a real-handwriting electromagnetic stylus, wherein the real-handwriting stylus comprises a variable-capacitance pressure sensor, wherein the variable-capacitance pressure sensor comprises a variable capacitor, a touch switch and a force measuring handle;
   a sensor housing and a reset spring;
   wherein the variable capacitor comprises an insulating medium sheet and a flexible conductive sheet; and
   wherein the touch switch comprises two stationary contacts and a movable contact piece; wherein an electric conductor is attached to a first side face of the insulating medium sheet to serve as a first electrode of the variable capacitor; a flexible conductive sheet is arranged at a distance less than 1 mm from a second side face of the insulating medium sheet to serve as a second electrode of the variable capacitor; the flexible conductive sheet is conductive foam that is compressible or conductive rubber that is deformable when being squeezed; a body of the insulating medium sheet is a capacitor medium between the first electrode and the second electrode of the variable capacitor, the reset spring is disposed between the insulating medium sheet and the sensor housing; under pressure of a force measuring handle, the insulating medium sheet is displaced and compresses the spring, and the movable contact piece of the touch switch touches and shorts the two stationary contacts arranged on the sensor housing so that the two stationary contacts of the touch switch are shorted and conducted; and when the pressure of the force measuring handle disappears, the reset spring is reset, and the movable contact piece of the touch switch moves away from the two stationary contacts on the sensor housing, and so that the two stationary contacts of the touch switch are cut off, wherein the real-handwriting optical stylus comprises a variable-capacitance pressure sensor, a stylus system circuit and a stylus housing, and further comprises a battery, an infrared (IR) transmitter and a nib;
   wherein the force measuring handle of the variable-capacitance pressure sensor also serves as a stylus nib,
   wherein the IR transmitter comprises an IR lens and an IR transmitting tube, the IR transmitting tube being arranged in the IR lens, the IR lens being arranged around the nib, and the IR lens uniformly transmitting infrared rays emitted by the IR transmitting tube to the surrounding of the stylus;
   wherein the stylus housing comprises a stylus housing front end and a stylus housing rear end;
   the battery and the stylus system circuit are arranged in the stylus housing rear end;
   the variable-capacitance pressure sensor and the IR transmitter are arranged in the stylus housing front end; and
   wherein the stylus system circuit comprises a radio frequency (RF) modulating and RF transmitting circuit, a driver circuit, a power control and delayed shutdown circuit, a power voltage converter and a function key,
   wherein the power control and delayed shutdown circuit of the stylus system circuit is connected to a short conducting signal of the touch switch, and the RF modulating and RF transmitting circuit of the stylus system circuit is connected to a capacitance variation value signal of the variable-capacitance pressure sensor; the RF modulating and RF transmitting circuit of the system circuit receives the capacitance variation value signal of the variable-capacitance pressure sensor, which is acquired and coded and then modulated into radio frequency and transmitted to an external device, and the external device receives the signal and demodulates it into the capacitance variation value signal and correspondingly converts the capacitance variation value signal into a stylus writing pressure value signal;
   wherein, in the operation state of the driver circuit of the system circuit, the driver circuit of the system circuit continuously transmits a drive signal to the IR transmitter, and the IR transmitter continuously emits an IR signal, and an optical touch inductor identifies the location at the nib where the IR transmitter continuously emitting the IR signal is located as a writing trace location where the nib is currently located in a writing area.

2. The real-handwriting stylus according to claim 1, wherein the power control and delayed shutdown circuit of the stylus system circuit is provided with a power input port, a power output port, a power charging control port and a stylus touch switch signal control port; the stylus touch switch signal control port is connected to the touch switch within the variable-capacitance pressure sensor; if the power control and delayed shutdown circuit, in a shutdown state, receives a short conducting signal connecting the touch switch of the variable-capacitance pressure sensor, the power input port and the power output port will be conducted to each other, and the stylus system circuit will enter an operation state; in the operation state, if the short conducting signal connecting the touch switch has not been received for a long time, the power input port and the power output port will be cut off from each other, and the stylus system circuit will enter a shutdown state; and if a charging mode is enabled at any operation state, the power input port and the power output port will be cut off from each other, and the stylus system circuit will be locked in the shutdown state and maintained in the charging mode.

3. The real-handwriting stylus according to 1, wherein the touch switch of the variable-capacitance pressure sensor triggers and wakes up the stylus system circuit to work, the variation quantity reflecting a writing pressure of the stylus, and the location of the IR transmitter in the wiring area of the optical touch inductor being the location where the wiring trace of the stylus is located.

4. The real-handwriting stylus according to claim 1, wherein the nib is made of a soft material at an end in contact for writing, and is made of a hard material at the other fixed end; a lead zirconate titanate (PZT) piezoelectric ceramic doped with Mo, Ti, Na and Cr is used at the nib, the weight percentages of the components being: Mo: 3.0-6.6 wt %; Ti: 0.01-0.1 wt %; Na: 0.01-0.1 wt %; and Cr: 2-5 wt %, and the material of the nib is formed by three times of sintering: first sintering in N2 and Ar atmosphere, then sintering in H2 atmosphere, and sintering in the same conditions in 02 atmosphere.

5. A real-handwriting stylus, comprising a real-handwriting optical stylus or a real-handwriting electromagnetic stylus, wherein the real-handwriting stylus comprises a variable-capacitance pressure sensor, wherein the variable-capacitance pressure sensor comprises a variable capacitor, a touch switch and a force measuring handle;

a sensor housing and a reset spring;

wherein the variable capacitor comprises an insulating medium sheet and a flexible conductive sheet; and wherein the touch switch comprises two stationary contacts and a movable contact piece; wherein an electric conductor is attached to a first side face of the insulating medium sheet to serve as a first electrode of the variable capacitor; a flexible conductive sheet is arranged at a distance less than 1 mm from a second side face of the insulating medium sheet to serve as a second electrode of the variable capacitor; the flexible conductive sheet is conductive foam that is compressible or conductive rubber that is deformable when being squeezed; a body of the insulating medium sheet is a capacitor medium between the first electrode and the second electrode of the variable capacitor, the reset spring is disposed between the insulating medium sheet and the sensor housing; under pressure of a force measuring handle, the insulating medium sheet is displaced and compresses the spring, and the movable contact piece of the touch switch touches and shorts the two stationary contacts arranged on the sensor housing so that the two stationary contacts of the touch switch are shorted and conducted; and when the pressure of the force measuring handle disappears, the reset spring is reset, and the movable contact piece of the touch switch moves away from the two stationary contacts on the sensor housing, and so that the two stationary contacts of the touch switch are cut off, wherein the real-handwriting electromagnetic stylus comprises a variable-capacitance pressure sensor, a stylus system circuit and a stylus housing, and further comprises a battery, an electromagnetic signal output coil and a nib;

wherein the force measuring handle of the variable-capacitance pressure sensor also serves as a stylus nib, wherein the electromagnetic signal output coil is a formed by tightly winding at least one layer of metal wire with an insulating surface for multiple turns, and is arranged around the nib;

wherein the stylus housing comprises a stylus housing front end and a stylus housing rear end, the stylus housing front end being made of an insulating material;

the battery and the stylus system circuit are arranged in the stylus housing rear end;

the variable-capacitance pressure sensor and the electromagnetic signal output coil are arranged in the stylus housing front end;

wherein the stylus system circuit comprises an LC active oscillator circuit, a power control and delayed shutdown circuit, a power voltage converter and a function key, wherein, the electromagnetic signal output coil is a resonant inductance of the LC resonant circuit, and the variable capacitor within the variable-capacitance pressure sensor is connected in parallel at the LC resonant circuit; a function key connected in series with the capacitors is connected in parallel at the LC resonant circuit; and the other regulation capacitor is connected in parallel at the LC resonant circuit, and the LC resonant circuit comprises the electromagnetic signal output coil, the variable capacitor within the pressure sensor, the capacitors connected in series with the key, and the other regulation capacitor.

6. The real-handwriting stylus according to claim 5, wherein the power control and delayed shutdown circuit of the stylus system circuit is provided with a power input port, a power output port, a power charging control port and a stylus touch switch signal control port; the stylus touch switch signal control port is connected to the touch switch within the variable-capacitance pressure sensor; if the power control and delayed shutdown circuit, in a shutdown state, receives a short conducting signal connecting the touch switch of the variable-capacitance pressure sensor, the power input port and the power output port will be conducted to each other, and the stylus system circuit will enter an operation state; in the operation state, if the short conducting signal connecting the touch switch has not been received for a long time, the power input port and the power output port will be cut off from each other, and the stylus system circuit will enter a shutdown state; and if a charging mode is enabled at any operation state, the power input port and the power output port will be cut off from each other, and the stylus system circuit will be locked in the shutdown state and maintained in the charging mode.

7. The real-handwriting stylus according to claim 5, wherein in the case of a change in the variable capacitor within the pressure sensor, or when the key is pressed and connected in series with the capacitors, or in the case of a change in the other regulation capacitor, the frequency of the LC active oscillator will be changed accordingly.

\* \* \* \* \*